United States Patent [19]

Tyler et al.

[11] Patent Number: 5,042,647
[45] Date of Patent: Aug. 27, 1991

[54] OVERLAPPING, NON-LEAKING CONVEYOR SLAT FOR DRY BULK MATERIALS

[75] Inventors: Mike W. Tyler; Donald M. Condor, both of Louisville; Marten Bultman, Peewee Valley, all of Ky.

[73] Assignee: Griffin & Company, Louisville, Ky.

[21] Appl. No.: 531,074

[22] Filed: May 31, 1990

[51] Int. Cl.$^5$ .............................................. B65G 17/10
[52] U.S. Cl. .................................... 198/822; 198/838; 198/845
[58] Field of Search ................ 198/822, 838, 845, 851

[56] References Cited

U.S. PATENT DOCUMENTS

| 614,847 | 11/1898 | Dick . | |
|---|---|---|---|
| 1,146,866 | 7/1915 | Graper . | |
| 1,462,427 | 7/1923 | Sterrett . | |
| 1,566,516 | 12/1925 | Baker et al. . | |
| 1,710,883 | 4/1929 | Llewellyn et al. . | |
| 1,769,992 | 7/1930 | Furbush . | |
| 1,794,182 | 2/1931 | Kunz . | |
| 1,824,756 | 9/1931 | Welser, Jr. ........................... | 198/845 |
| 1,883,528 | 10/1932 | Buck . | |
| 2,045,957 | 6/1936 | Loose . | |
| 2,222,025 | 11/1940 | Fischer . | |
| 2,336,698 | 12/1943 | Morrill . | |
| 2,658,607 | 11/1953 | Moynihan ....................... | 198/845 X |
| 2,746,595 | 5/1956 | Kronylak . | |
| 2,810,467 | 10/1957 | Bogaty . | |
| 2,823,790 | 2/1958 | Sifford et al. . | |
| 2,987,167 | 6/1961 | Franz . | |
| 2,987,168 | 6/1961 | Franz . | |
| 3,034,638 | 5/1962 | Franz .............................. | 198/845 X |
| 3,044,604 | 7/1962 | Steigleder ....................... | 198/851 X |
| 3,082,861 | 3/1963 | Kronylak . | |
| 3,083,810 | 4/1963 | Zebarth et al. . | |
| 3,123,202 | 3/1964 | Stevens . | |
| 3,174,618 | 3/1965 | Wesson . | |
| 3,191,757 | 6/1965 | Parkes et al. ......................... | 198/851 |
| 3,194,388 | 7/1965 | Wulff . | |
| 3,243,035 | 3/1966 | Ratkowski ......................... | 198/822 |
| 3,259,228 | 7/1966 | Wilding .......................... | 198/838 X |
| 3,265,193 | 8/1966 | Bessant .......................... | 198/838 X |
| 3,311,222 | 3/1967 | Crawford et al. ............... | 198/822 X |
| 3,407,918 | 10/1968 | Clarke . | |
| 3,735,881 | 5/1973 | Wilding . | |
| 3,811,585 | 5/1974 | Wilding . | |
| 3,934,712 | 1/1976 | Jende . | |
| 4,326,626 | 4/1982 | Brockwell . | |
| 4,718,541 | 1/1988 | Wilding .......................... | 198/845 X |
| 4,840,269 | 6/1989 | Anderson ....................... | 198/851 X |

FOREIGN PATENT DOCUMENTS

| 1000281 | 1/1957 | Fed. Rep. of Germany . | |
| 956473 | 1/1975 | Fed. Rep. of Germany . | |
| 699473 | 1/1931 | France . | |
| 797118 | 6/1958 | United Kingdom ................ | 198/822 |

Primary Examiner—D. Glenn Dayoan
Attorney, Agent, or Firm—Wood, Herron & Evans

[57] ABSTRACT

An improved slat conveyor includes an improved slat having leading and trailing edge configurations inhibiting conveyed product leakage through the slat-formed apron. A leading edge of one slat overlaps and engages the depressed rearward edge of a preceding adjacent slat providing a substantially co-planar product apron. Movement of the slats about a headstock at a conveyor discharge end disengages the leading from the rearward edge, opening a slight gap between the slats so any captured product can fall out, as well as providing a scraping action of the trailing edge of a preceding slat with respect to the underside of the leading edge of a following slat to dislodge entrapped or impacted product. At the same time the leading edge overhangs the preceding slat so discharging product slides off the slats into the discharge location and not between the slats.

9 Claims, 2 Drawing Sheets

OVERLAPPING, NON-LEAKING CONVEYOR SLAT FOR DRY BULK MATERIALS

BACKGROUND OF THE INVENTION

This invention relates to conveyors of the slat type construction, and particularly to an improved slat for slat conveyors handling dry bulk materials.

While slat conveyors have been employed for handling a variety of products, the problems with which this invention is concerned will be discussed in relation to the handling of a bulk material, such as tobacco or food products.

In the past, slat conveyors of the type shown in U.S. Pat. No. 3,259,228 have been used to convey dry bulk materials such as tobacco. Such patent is incorporated herein by this reference for background. While such slats have proved very useful, small particles of dry bulk materials work their way through the spaces between the slats. Such particles then fall onto the lower return slat run, onto the chain drives, and onto the end pulleys or sprockets, take-up mechanisms or the like. These particles are compacted and must periodically be cleaned from the conveyor apron and its components to prevent stoppage or excessive power drag. This cleaning requires undesirable system downtime.

Accordingly, one object of this invention is to provide a slat conveyor apron which prevents conveyed materials from leaking between the slats in the conveying run onto lower conveyor apparatus. Another object of this invention is to provide a non-leaking slat conveyor providing an improved continuous apron suitable for handling dry bulk material.

SUMMARY OF THE INVENTION

To these ends, a preferred embodiment of the invention includes a slat conveyor comprised of a plurality of chain-drawn slats having a product carrying member defining an upper surface of each slat. Each product carrying member has an elongated forward or leading edge and a parallel elongated rearward edge. The member has a substantially planar surface extending from the leading edge toward the rearward edge which is defined by a depressed marginal area disposed below the plane of the planar surface.

When the slats are operatively disposed adjacent each other, the leading edge is oriented in overlapping disposition to the rearward edge and depressed marginal area of the preceding slat. The plurality of slats in an upper conveyor run thus presents a substantially co-planar surface for product.

In use, as the slats approach the discharge end of the conveyor and a forward slat begins to tilt and descend about the end sprockets or headstock, it drops away from the forward edge of the trailing slat. Nevertheless, the extreme leading edge of the trailing slat overlies the preceding slat surface such that any product on the trailing slat is dropped off into the preceding, descending slat and thus off the conveyor, rather than between the slats and onto the lower return run, chains, sprockets and the like. Moreover, the overlapping leading edge is preferably maintained in contact with the trailing edge of a preceding slat throughout the active conveyor run, preventing or inhibiting product leakage. In this way, product is kept from migrating onto returning slats or into the mechanism and cleaning and downtime are significantly reduced.

Moreover, as a forward slat begins to descend and rotate about a headstock, a very slight gap is opened between its trailing edge at the underside of the leading edge of the next following slat, permitting entrapped product to fall out. Still further, the accelerating rotational movement of the preceding slat causes its trailing edge to slightly rotate with respect to the following slat and produce a scraping action as the underside of the leading edge of the following slat. This provides a self-cleaning feature further ejecting entrapped compacted product.

BRIEF DESCRIPTION OF THE DRAWINGS

These and other objects and advantages will become readily apparent by reference to the following detailed description of a preferred embodiment of the invention and from the accompanying drawings wherein.

DESCRIPTION OF THE PREFERRED EMBODIMENT

Figure 1:
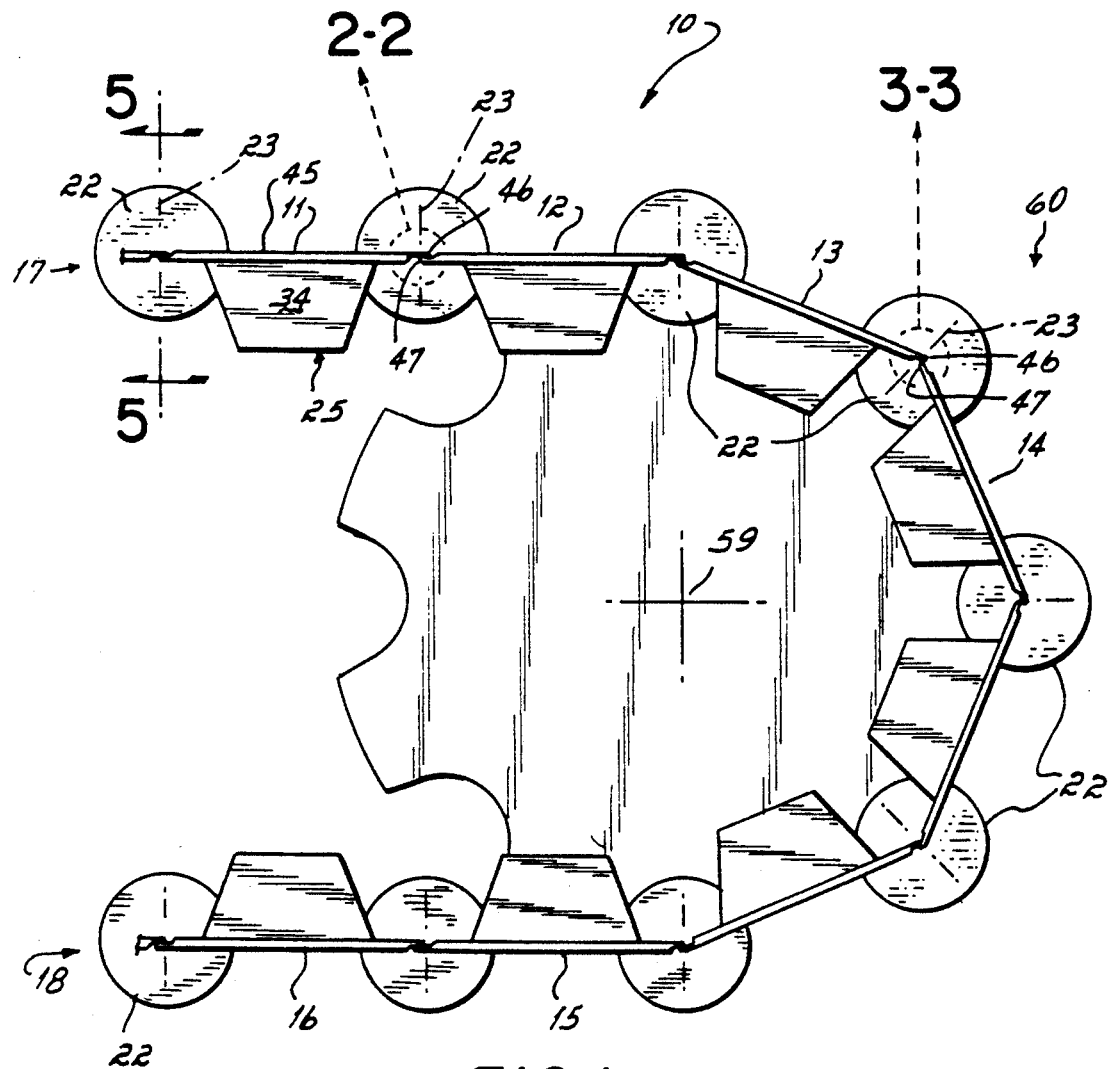
FIG. 1 is an elevational view of a slat conveyor provided with the slat members of this invention and showing the slats carried around a headstock at a discharge end of the conveyor.

Referring now to the drawings in more detail, slat conveyor 10 (FIG. 1) is shown therein. The conveyor comprises a plurality of slats, such as those shown in 11-16, for example. The conveyor 10 is designed by an upper run 17 and a lower return run 18, which the slats are disposed in an upside down orientation (FIG. 1). Preferably, the conveyor is like that described in U.S. Pat. No. 3,259,228 incorporated herein by reference, with the exception of the slat structure as further described herein.

Each of the slats is mounted to and extends between conveyor chains 19 and 20. Each chain has side link plates 21 to which the slats are attached, and rollers 22. Each roller 22 has an axis 23 about which it rotates and which will be further discussed.

Figure 4:
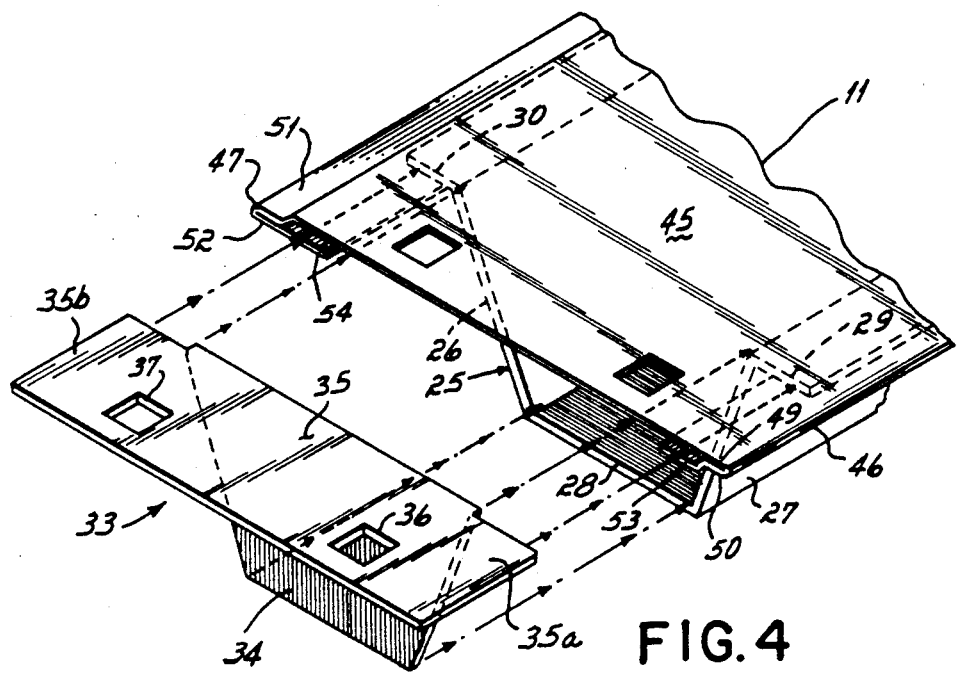
FIG. 4 is a perspective view of the end area of one slat according to a preferred embodiment of the invention.
Figure 5:
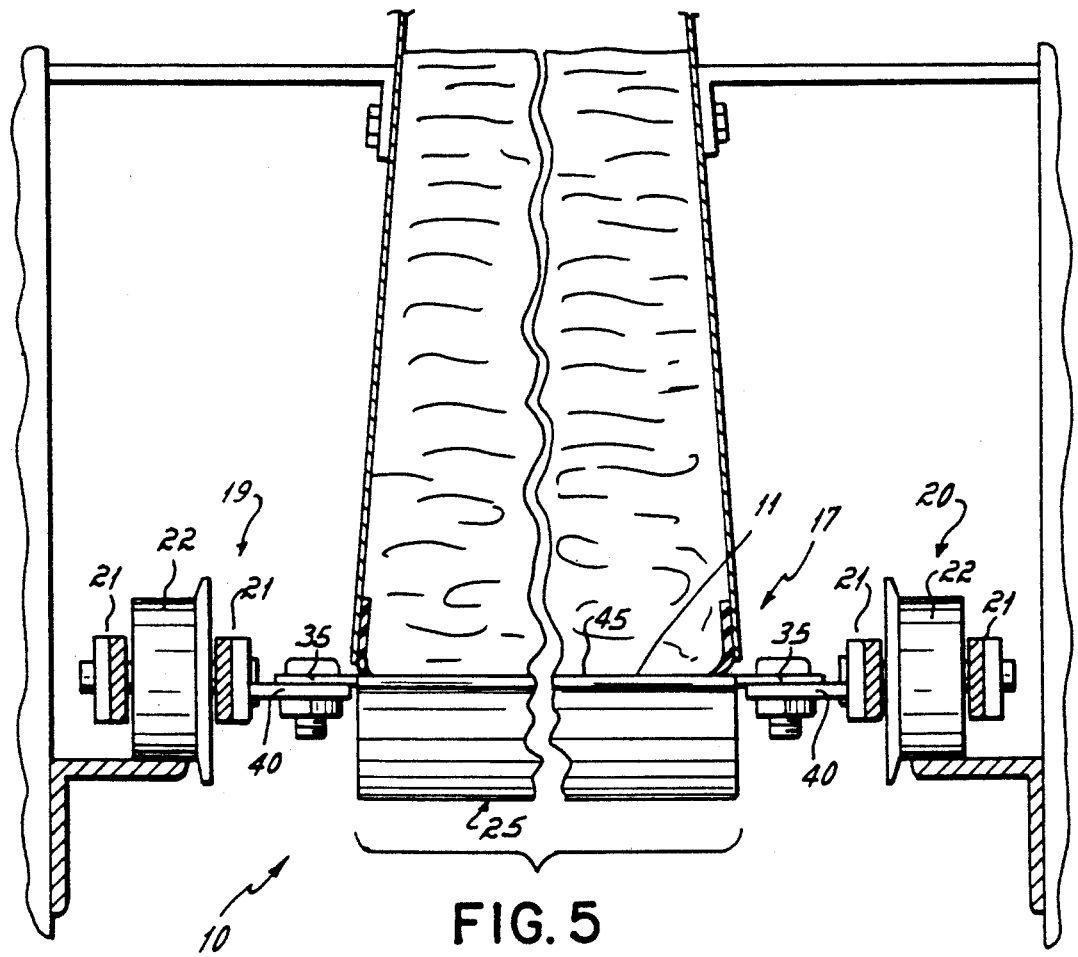
FIG. 5 is a typical cross-section showing an upper slat conveyor run, in one of its possible uses, as a floor in a product silo or bin.

The slats 11 to 16 (and others in the conveyor 10) are preferably identical and only one will be described. The slats each comprise a box-like reinforcing member 25, having the shape as best seen in FIG. 4, with two upwardly diverging legs, 26 and 27, joined by a base leg 28. Each of the upwardly diverging legs 26 and 27 terminate in horizontal, forward and rearward flanges 29 and 30, which lie in the same common plane. Each end of the slat is capped off by an endcap 33, having an endplate 34, and an upper flange 35, turned at 90 degrees, with respect to the orientation of the end plate 34. The upper flange 35 has respective forward and rearward flanges 35a and 35b which extend with and are co-planar with the flanges 29 and 30 respectively of the box member 25 when the endcap is in place on the slat.

Holes 36 and 37 are disposed in the upper flange 35 for the purpose of securing the slat to a plate 40, secured to the respective chain side links at each end of the slat (FIG. 4). Accordingly, it will be appreciated that when the endcap 33 is in place, the upper flange 35 forms a co-planar continuation of the flanges 29 and 30, associated with the box member 25, and the end plate 34 is nested within the box member 25.

The particular configuration of the box-like slat structure and its inner connection to the chains is not of particular importance to this particular invention, except in so far as to provide the flanges 29, 30, 35a and 35b as will be further discussed.

Reference is also made to U.S. Pat. No. 3,259,228, which discloses a slat member having the same configuration and being attached to conveyor chains in the same manner as that slat described above.

The slats of this invention, however, further comprise an upper product carrying surface or member 45. Each of these is provided with a leading edge 46 and a depressed rearward edge 47. The product support or carrying surface 45 is comprised preferably of stainless steel sheet which is configured to provide the leading and rearward edges 46 and 47. This sheet is mounted on the box-like member 25 and endcaps 33 by means of reverse bends in the sheet 45, as will now be described.

Considering first the leading edge 46 of the member 45, it will be appreciated that that leading edge is defined by an upper marginal area 49 and a lower marginal area or surface 50. The surfaces 49 and 50 define a reverse bend in the sheet 45 and lie adjacent to each other, one atop the other, to form the elongated leading edge 46.

It will be appreciated that the flange 29 of the box-like member 25 is of preferably one thickness, while the thickness of the sheet 45 is substantially thinner. As viewed in FIGS. 2 and 4, for example, it will be appreciated that the reverse bend defined by the selvage areas 49 and 50 provide in combination a thickness which is less than that of the flange 30. Thus it will be appreciated that while the leading marginal area 49 is co-planar with substantial remaining portion of the sheet 45, the lower surface 50 resides above the lower surface of the flange 30.

Moving now to the rearward edge of the slat, it will be appreciated that the member 45 extends over the edge of the trailing flange 30 and is depressed downwardly to form an upper marginal area 51, and then around a reverse bend to form a lower marginal area or surface 52 thereunder. The marginal areas 51 and 52 form, at the reverse bend, an elongated trailing or rearward edge 47. It will also be appreciated that the lower marginal areas 50 and 52 are respectively extended as at 53 and 54, beneath the respective flanges 29 and 30 in order to engage the flanges and mount the product carrying surface member 45 on the slat structure.

It will also be appreciated that the members 49–52 overlap the forward and rearward flanges 35a and 35b of the endcaps 33 in like fashion, the flanges 35a and 35b extending in the same plane as the respective flanges 29 and 30. Thus, while the outwardly facing flanges of the box-like member 25 and endcaps 33 are of two parts, the product carrying surface member 45 extends over them to form a one-piece upper slat surface.

It will also be appreciated, as perhaps best seen in FIG. 1, that the product carrying surface members of each slat are mounted in substantially the same plane throughout the slats in the upper conveying run for example. It will also be appreciated that the leading edge 46 and its respective marginal areas 49 and 50 overlap the trailing edge 47 and its respective upper and lower marginal areas 51 and 52, as shown for example in FIG. 3. There is preferably no clearance between the respective adjacent marginal areas of the leading and rearward elongated slat edges.

Figure 3:
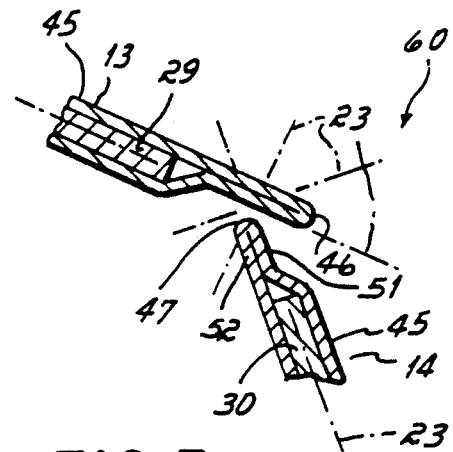
FIG. 3 is an enlarged view of the encircled area marked 3—3 of FIG. 1, showing the diverging slat edges as the slats are conveyed about the headstock.

Also as perhaps best seen in FIG. 3, it will be appreciated that the trailing edge 47 lies essentially in the same plane as a vertical line drawn through the respective roller axis 23 when the slats are mounted to the chains. It will also be appreciated that the leading edge 46 of the immediately trailing slat is disposed forwardly of the plane in which lies the vertical line extending through the roller axis 23.

The purpose and result of this is perhaps best illustrated in FIG. 1, where it will be appreciated that the leading edge 46 overlaps and extends ahead of the edge 47. FIG. 1, of course, depicts the slat conveyor transitioning from the upper run 17, around a headstock, having its center at 59 for example, to the lower run 18. In this regard, it would be appreciated that product is being carried on the upper surface 45 of the slats in the upper conveying run 17. As the slats, however, approach the headstock at discharge end 60 and are transitioned around the curve to the lower return run, the conveyed product, carried on the slats is dropped over the end of the conveyor.

Considering the slats 13 and 14 in FIGS. 1 and 3, it will be appreciated that product thereon begins to slide forwardly toward the discharge end 60 of the conveyor. As that product reaches the leading edge 46 of slat 13, it can fall off the slat. Any product doing so then falls onto the upper product carrying surface of the slat 14. The angle of the slat 14 is, of course, much more severe than that of slat 13 at the particular instant as shown in FIGS. 1 and 3 and product falls much more quickly off the slat 14 onto a receiving conveyor, hopper or other device. At the same time, it will be appreciated that the leading edge 46 of the slat 13 overlaps the trailing or rearward edge 47 of the slat 14, thereby preventing any product on slat 13 from falling between the slats 13 and 14. In this way, product is maintained above the conveyor and does not fall through or between the slats down onto the lower or underneath run 18 of the conveyor during the transition from the upper to the lower run.

Figure 2:
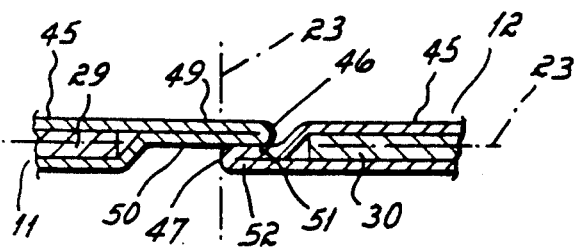
FIG. 2 is an enlarged view of the encircled area marked 2—2 of FIG. 1, showing the overlapping orientation of the slat edges in a conveying run of the preferred embodiment.

Also, as perhaps best seen in FIG. 2, it will be appreciated that the leading edge 46 of the slat 11, for example, in the upper run, is in engagement with the trailing edge 47 of the preceding slat 12. This prevents any material on the slats from leaking through any gap or opening between the slats onto the lower slat run. Since the leading edge of the slats 46 extends through and forwardly of, with respect to the direction of motion, the axis 23 of the chain rollers, this orientation is maintained and product on the upper run and on the descending slats at the headstock or discharge end of the conveyor cannot drop between the slats.

Further, referring to FIGS. 1 and 3, it will be appreciated that a very slight gap may be opened between the trailing and leading edges of preceding and immediately following slats. Entrapped product can fall out. The gap shown in FIG. 3 is exaggerated for clarity. Moreover, it will be appreciated that the trailing edge of a descending slat will have a rotational component of motion with respect to the underside of the leading edge of a following slat. This produces a scraping action between the adjacent edges, helping to dislodge any entrapped or compacted product and providing a self-cleaning action.

While the configuration described above might be used with slat conveyors of different dimensions, one specific embodiment of this invention includes a slat conveyor where the distances between the roller axes 23 is about six inches and the distance across the outermost portions of the upper surface members 45 from leading to trailing edges, is approximately six and 3/16ths inches. Within these parameters, the outermost leading edges 46 are in substantial overlap with the trailing or rearward edges 47 of the adjacent preceding slat members. In the preferred embodiment of this invention, a so-called six inch slat (actually six and 3/16th inches), by ten feet long will hold approximately 400 pounds of product weight, with approximately 7/16ths, inches deflection. If a center support is utilized (not shown), deflection can be limited to about 1/32nd of an inch. The actual capacity of the slat can be increased or decreased as required for particular configuration.

It will be appreciated that the conveyor and the slats and associated components described herein could be made to other suitable dimensions, retaining, however, the relationship between the leading and trailing slat edges.

Also, of course it will be appreciated that this overall slat construction has the flexibility to bend with the chainlinks as they turn about the headstock, thereby opening a slight gap, as best seen in FIGS. 1 and 3, to permit any material trapped therein to fall away from the slat conveyor. Even more importantly, the preceding slat's trailing edge moves or rotates with respect to the leading edge of the following slat such that the trailing edge acts as a scraper helping to dislodge any entrapped or compacted product.

The slat members can be made of stainless steel or any other suitable material. It is preferred, however, that the product carrying surface member 45 be stainless, particularly when used in the handling of bulk food product, but it will be appreciated that the slat conveyor can be used in storage or conveying of many different products in differing environments, such as bulk particulates, foods, tobacco, recycling waste products and the like and that any suitable slat materials can be used.

It will be appreciated that these and other advantages and modifications will become readily apparent from the foregoing to those of ordinary skill in the art, without departing from the scope of the invention and applicant intends to be bound only by the claims appended hereto.

What is claimed is:

1. A conveyor comprising; support means, conveyor chain means including rollers mounted on respective axes, said rollers adapted to be moved over said support means, a plurality of slat members extending from side to side of the conveyor, and connected to said chain means, each said slat member comprising a reinforcing member having flange portions lying in a common plane, a generally planar surface member with opposed forward and rearward edges each having a reverse bend therein to provide a recess in which said flange portions are secured, said rearward edges depressed from the generally planar surface member, the forward edges of each said slat member being in substantially overlapping engagement with the depressed rearward edges of the adjacent slat members to form a continuous substantially co-planar apron for handling bulk materials, and said rearward edge being disposed in the same plane as a vertical line drawn through a respective roller axis when said planar surface member is horizontally disposed, wherein the forward edge of one slat in a conveying run overlaps and engages the rearward edge of a preceding slat in the conveying run, wherein said slats are conveyed about a headstock at a discharge end of the conveyor, wherein said forward edge and said rearward edge slightly separate as said slats are conveyed about said headstock with said forward edge of said one slat projecting over the rearward edge of said preceding slat, and wherein the rearward edge of a preceding slat has a rotational motion with respect to an underside of the forward edge of a following slat for scraping off material disposed between said forward edge of a following slat and the rearward edge of the preceding slat.

2. A slat conveyor having a plurality of slats, forming an apron disposed about an end stock, each slat comprising an upper slat member having a substantially planar product conveying surface, a forward edge having an upper surface co-planar with the product carrying surface, and a rearward edge having an upper surface disposed in a plane below that of the product carrying surface wherein the forward edge of one slat overlaps the rearward edge of a preceding slat such that the product conveying surface of slats in a conveying run are substantially co-planar, wherein said slats are mounted at their ends to respective side links of two roller chains disposed at opposite ends of the slats, said chains having rollers disposed for rotation about roller axes and said rearward edge of each said slat lying on a respective roller axis, and wherein the forward edge of each slat extends forwardly of the roller axis on which lies the rearward edge of the immediately preceding adjacent slat, and wherein the rearward edge of a receding slat has a rotational motion with respect to an underside surface of the forward edge of a following slat for scraping off material therebetween when said apron is moved about said end stock.

3. A slat conveyor as in claim 2 wherein each slat further includes a box-shaped reinforcing member provided with forward and rearward upper co-planar flanges, and wherein said upper slat member comprises a sheet having reverse bends therein, capturing therebetween respectively the flat forward and rearward extending flanges, the upper surface of the reverse bend at the rearward edge of a slat being disposed lower than the upper flat surface of the co-planar flanges.

4. A slat for a slat conveyor comprising; a generally planar surface member defining a product carrying surface and having opposed elongated forward and rearward edges with a reverse bend at each edge forming a recess therein, a reinforcing member having a forward and rearward flange portions on opposed sides thereof lying in a common plane, said flange portions being retained in said respective recess portions, and said rearward edge of said surface member having an upper surface disposed within said plane and said forward edge of said surface member having a lower surface disposed with said plane.

5. A slat as in claim 4 wherein said forward edge has a predetermined thickness approximately equal to the distance between the product carrying surface and the upper surface of said rearward edge 6. A slat as in claim 4 wherein the forward edge extends forwardly beyond said forward flange, the rearward edge extends rearwardly of the rearward flange, and wherein the extension of the forward edge beyond the forward flange is greater than the extension of the rearward edge rearwardly of the rearward flange.

7. A slat conveyor for conveying particulate material and comprising:

a conveying means;

a plurality of slats operably carried by said conveying means one after another, each slat having a particulate material carrying surface terminating at a forward leading edge;

a flat, undersurface extending rearwardly from the forward leading edge of each slat;

said plurality of slats defining a particulate carrying apron;

said conveying means including an end stock about which said apron is conveyed;

a rearward edge of a preceding slat having a rotational motion with respect to said flat undersurface of a following slat for scraping off particulate material between said flat undersurface and said rearward edge.

8. A slat conveyor for conveying particulate material and comprising:

a conveying means;

a plurality of slats operably carried by said conveying means one after another, each slat having a particulate material carrying surface defined in part by a forward edge, having a flat undersurface, and a rearward edge;

said plurality of slats defining a particulate carrying apron;

said conveying means including an end stock about which said apron is conveyed;

a rearward edge of a preceding slat having a rotational motion with respect to said flat undersurface of a following slat for scraping off particulate material between said flat undersurface and said rearward edge, wherein said conveying means includes rollers mounted on axes parallel to said material carrying surfaces, the rearward edge of each slat lying in a plane containing a line through a respective roller axis and perpendicular to said material carrying surface.

9. A slat conveyor as in claim 8 wherein the forward edge of an immediately following slat is disposed forwardly of said line.

* * * * *